United States Patent [19]

Gretz et al.

[11] Patent Number: 4,722,545
[45] Date of Patent: Feb. 2, 1988

[54] METHOD AND APPARATUS FOR DETERMINING THE CENTER POSITION OF A VEHICULAR STEERING SYSTEM

[75] Inventors: James A. Gretz, Berkley; Michael W. Soltis, Dearborn, both of Mich.

[73] Assignee: Ford Motor Company, Dearborn, Mich.

[21] Appl. No.: 46,005

[22] Filed: May 4, 1987

[51] Int. Cl.⁴ .............................................. B62D 15/00
[52] U.S. Cl. ........................................ 280/771; 180/79; 180/252; 180/141; 280/707
[58] Field of Search ............... 180/252, 79, 132, 79.1, 180/141, 142, 143; 280/771, 774

[56] References Cited

U.S. PATENT DOCUMENTS

| | | | |
|---|---|---|---|
| 3,608,925 | 9/1971 | Murphy | 280/112 |
| 3,895,816 | 7/1975 | Takahashi et al. | 280/6 H |
| 4,313,529 | 2/1982 | Kato et al. | 188/299 |
| 4,345,661 | 8/1982 | Nishikawa | 180/141 |
| 4,392,540 | 7/1983 | Michio et al. | 180/142 |
| 4,555,126 | 11/1985 | Ishimitsu et al. | 280/707 |
| 4,564,214 | 1/1986 | Tokunaga et al. | 280/707 |
| 4,575,116 | 3/1986 | Miyata | 280/772 |
| 4,621,833 | 11/1986 | Soltis | 280/707 |
| 4,652,011 | 3/1987 | Hollerwefer et al. | 280/771 |
| 4,690,431 | 9/1987 | Ito et al. | 280/771 |

*Primary Examiner*—Richard A. Bertsch
*Attorney, Agent, or Firm*—Jerome R. Drouillard; Roger L. May

[57] ABSTRACT

A method and apparatus for determining a center position of the vehicular steering system includes a steering sensor and a control unit. A variable sampling time strategy is employed to determine a precise center for the steering system. As an option, the control algorithm may employ both variable sampling time and a variable size for a window of operation.

18 Claims, 8 Drawing Figures

|  | DETECTOR A | DETECTOR B |  |
|---|---|---|---|
| COUNTER-CLOCKWISE ROTATION ↑ | 0<br>1<br>1<br>0<br>0<br>1 | 0<br>0<br>1<br>1<br>0<br>0 | CLOCKWISE ROTATION ↓ |

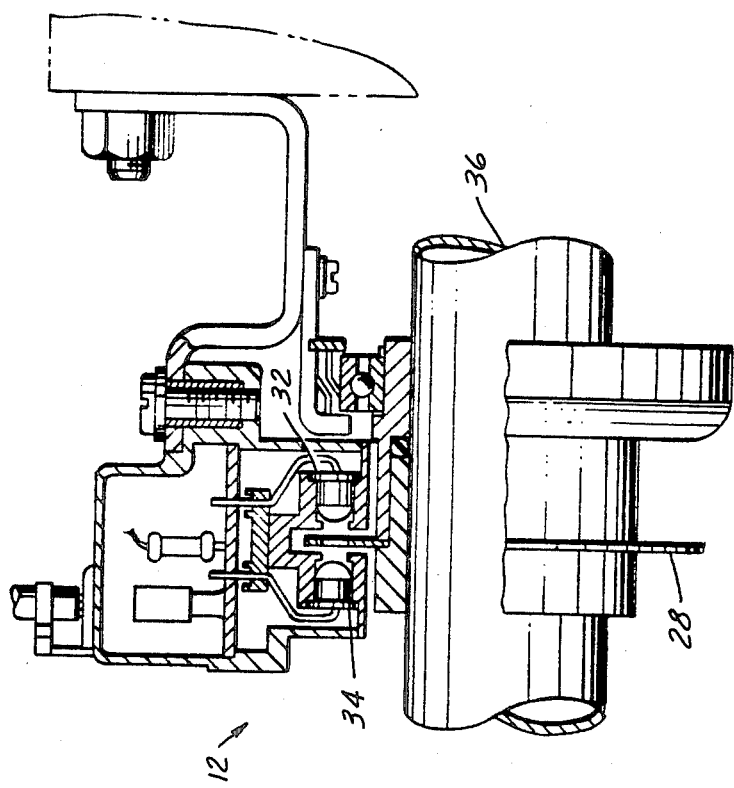
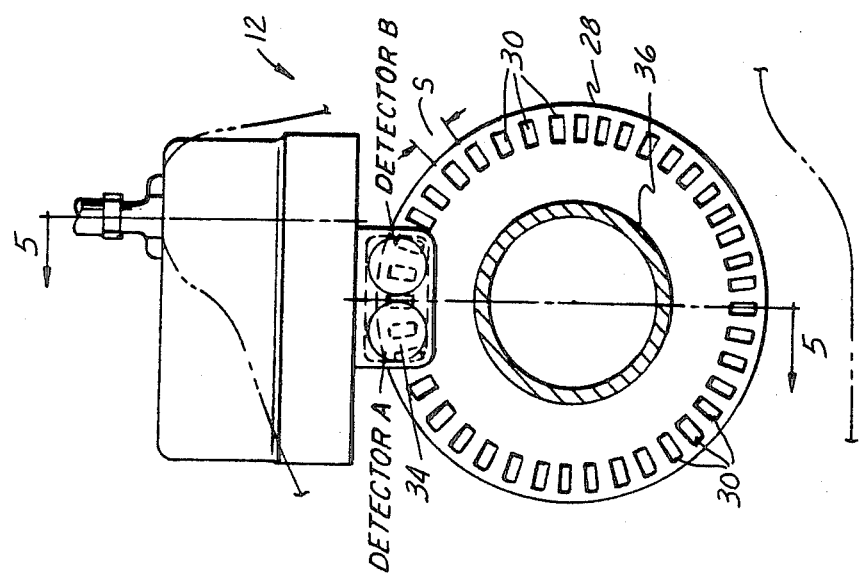

METHOD AND APPARATUS FOR DETERMINING THE CENTER POSITION OF A VEHICULAR STEERING SYSTEM

BACKGROUND OF THE INVENTION

This invention relates to a method and apparatus for determining the center position of a vehicular steering system. This method and apparatus are useful for controlling a vehicular suspension system or a vehicular steering gear.

DISCLOSURE INFORMATION

Adaptive automotive suspension systems are known in the art. An example of such a system is shown in U.S. Pat. No. 4,621,833, which is assigned to the assignee of the present invention. The system of the '833 patent is described in Society of Automotive Engineers (SAE) technical paper #870540. Such adaptive suspension systems typically adjust damping force provided by one or more suspension units according to a plurality of inputs received from different sources within the vehicle. For example, it is known to control suspension units by utilizing vehicle linear acceleration, braking, steering activity, vehicle speed, predicted lateral acceleration, and other inputs.

U.S. Pat. Nos. 3,608,925, 4,345,661, 4,555,126, and 4,564,214 illustrate the use of steering inputs for the control of suspension units. A related type of control is disclosed is U.S. Pat. No. 3,895,816 in which a centrifugal force sensor is operatively associated with valving to bias the vehicle so as to prevent excessive body roll during cornering. Systems employing fixed steering angle sensors are prone to failure due to misadjustment of the sensor inasmuch as precise angular measurements must be obtainable from such sensors if they are to be employed in systems capable of correcting or anticipating and preventing excessive roll of an automobile body during a cornering maneuver. A related problem affects systems employing centrifugal force sensors inasmuch as such forces cannot be sensed until it exists, and once such force has come into existence the vehicle's body will typically have assumed an attitude which can be corrected only by an active suspension device capable of exerting force independently of its velocity of operation. Thus, to be effective, a device for providing input to a control system for operating this suspension unit should anticipate lateral acceleration rather than merely sense acceleration. U.S. Pat. No. 4,621,833 discloses a steering center algorithm and method for finding steering center which is suitable for use in a system capable of anticipating lateral acceleration rather than merely sensing such acceleration.

The steering sensor system disclosed in U.S. Pat. No. 4,621,833 employs a software program in which steering center position is determined through the use of a fixed sample time detection scheme operating with variably sized circumferential window zones of operation of a steering shaft. Because the sampling time associated with the algorithm of U.S. Pat. No. 4,621,833 is fixed, the system disclosed therein has a limited capacity to deal with changes in steering center position.

It is an object of the present invention to provide a method and apparatus for dynamically determining the center position of a vehicular steering system.

It is yet another object of the present invention to provide a method and apparatus for determining the center position of a vehicular steering system which will rapidly determine a correct steering center position and will rapidly be able to revise a previously determined center position.

It is an advantage of the present invention that the variable sampling time and variable sampling window size features of the algorithm set forth herein will deliver fast response to changing vehicle conditions coupled with high confidence in the determined center position.

SUMMARY OF THE DISCLOSURE

In accordance with the present invention, a method for determining the center position of a vehicular steering system comprises the steps of: assuming an initial center position; counting the amount of window time during which the system has remained within a window of operation extending about the assumed center position; comparing the counted window time to a variable sampling time; measuring the difference between a steering system position characteristic value and the assumed center position whenever the window time bears a predetermined relationship to the sampling time; adjusting the assumed center position according to the measured difference between the steering system position characterstic value and the assumed center position; adjusting the sampling time according to the measured difference between the steering system position characteristic value and the adjusted center position; and repeating each of the above steps sequentially with an adjusted center position substituted for the assumed center position. The counted window time may be set equal to zero whenever the steering system is operated outside of the window of operation extending about the assumed center position as well as whenever the window time is equal to the sampling time. The window of operation preferably comprises an angular region of operation of a rotatable steering shaft with the angular region having a predetermined size. The window of operation is relocated whenever the rotatable steering shaft is operated outside of the window so that the relocated window extends on either side of the instantaneous position of the steering shaft. The window of operation may comprise an angular region of operation for rotatable steering shaft with the angular region being of variable size where the size of the window bears a predetermined relationship to the sampling time. The size of the window is preferably decreased as the sampling time is increased. In any event, each of the steps of determining the center position is repeated sequentially until the sampling time reaches a predetermined value. The difference between the steering system position characteristic value and the assumed center position is measured preferably whenever window time is equal to the sampling time. Sampling time is preferably increased when the measured difference between the steering system position characteristic value and the adjusted steering position is less than a predetermined value. Sampling time is preferably decreased when the measured difference between the steering system position characteristic value and the adjusted center position is greater than the predetermined value. The steering system position characteristic value may comprise the instantaneous steering system position, or it may comprise a time-average steering system position, or it may comprise the center of the window of operation of the steering system.

According to the present invention, a means for determining the center position of a vehicular steering system comprises: sensor means for: (i) measuring the difference between the instantaneous position of the steering system and a previously determined center position, and (ii) for defining a window of operation extending about the center position. The means for determining the center position further comprises a window timer operatively connected with the sensor means for determining the amount of time the steering system is operated within the window, as well as the sampling time register operatively connected with the sensor and window timer for holding an appropriate sampling interval between successive events in which the sensor measures the difference between the instantaneous position of the steering system and the previously determined center position. Finally, the instant means for determining a center position of a steering system comprises processor means operatively connected with the sensor means and the window and sampling time register for: (i) directing the sensor means to measure the difference between the instantaneous position of the steering system and the previously determined center position when an appropriate sampling interval has been reached; and (ii) adjusting the previously determined center position based upon the measured difference between the instantaneous position of the steering system and the previously determined center position; and (iii) adjusting the sampling interval held by the sampling time register according to the magnitude of the measured difference. According to this invention the sensor preferably comprises a rotary device operatively connected with a rotatable steering shaft. The sensor means preferably relocates the window of operation whenever the steering system is operated outside of the window such that the instantaneous center of the window is coincident with the instantaneous operating position of the steering system at the time the window is relocated.

BRIEF DESCRIPTION OF THE DRAWINGS

FIG. 4 is a plan view, partially cut away, of a steering sensor comprising a component part of a center finding system according to the present invention.

FIG. 5 is a cross sectional view of the steering sensor of the present invention taken along the line 5—5 of FIG. 4.

DESCRIPTION OF THE PREFERRED EMBODIMENTS

Figure 1:
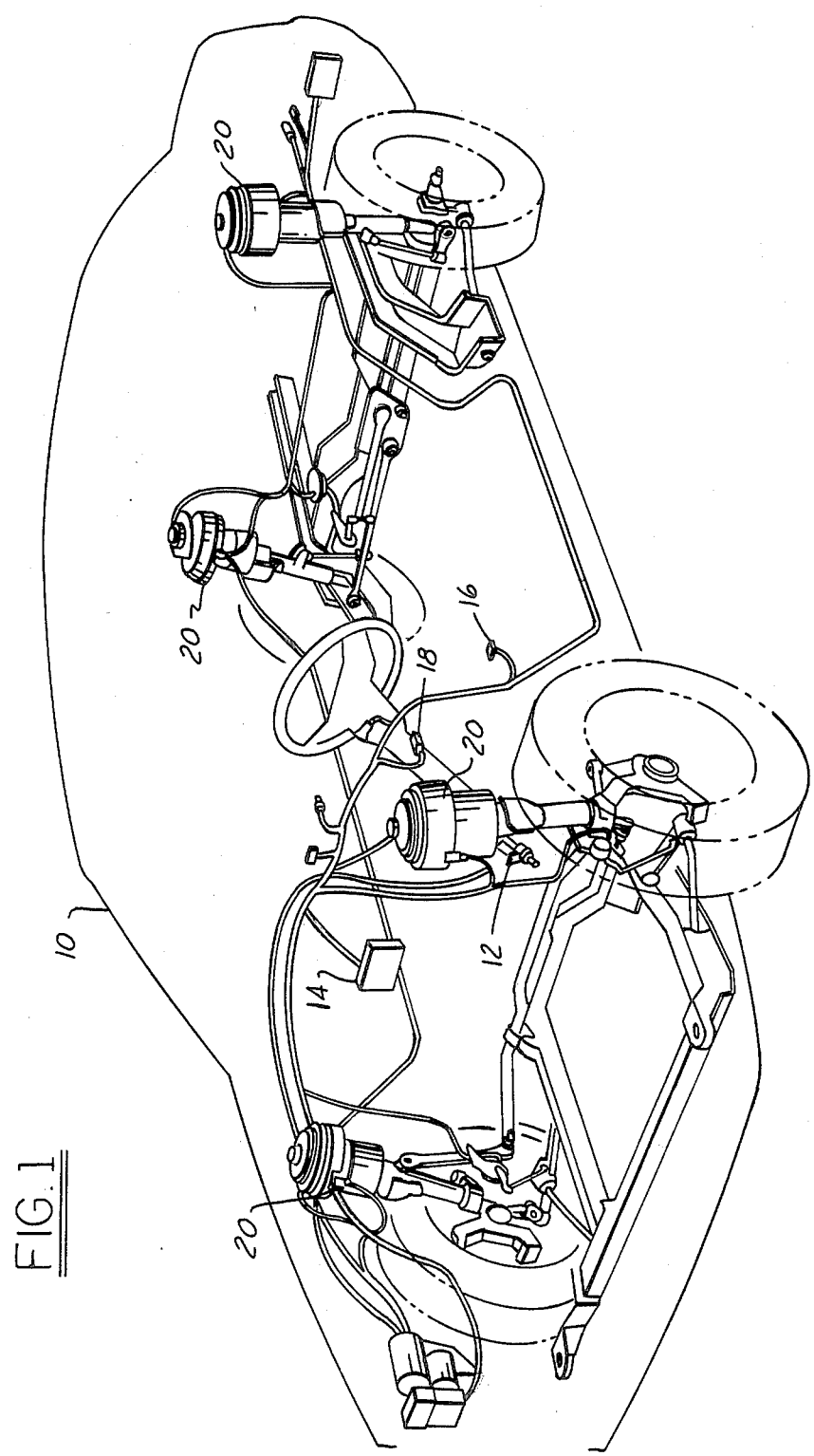
FIG. 1 is a perspective drawing of a motor vehicle incorporating the present invention. This figure shows various components of a system embodying the present invention.
Figures 2, 7:
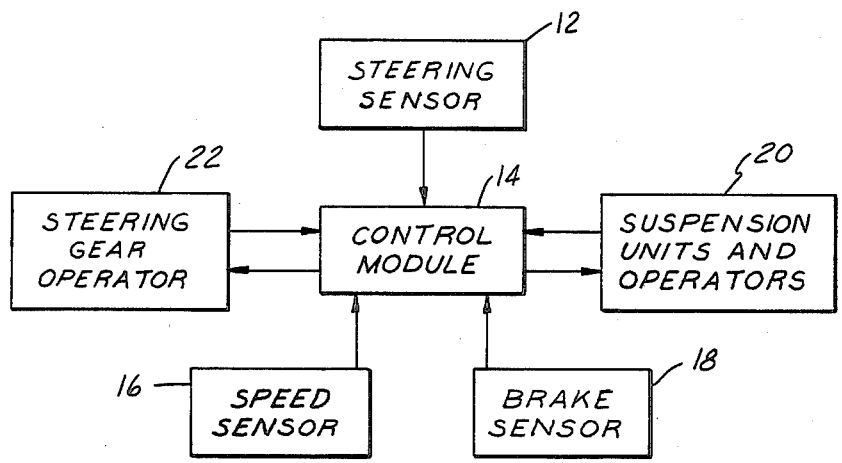
FIG. 2 is an overall system block diagram in accordance with an embodiment of this invention.
FIG. 7 is a truth table illustrating the outputs of detectors A and B illustrated in FIGS. 4–6 as the steering sensor of the present invention is rotated counterclockwise and clockwise.

As shown in FIG. 1, the method and apparatus of the present invention is intended for use with adjustable suspension units typically found in automotive vehicles. As shown in FIG. 2, moreover, the method and apparatus of the present invention is also intended for use with an adjustable steering gear.

The motor vehicle shown in FIG. 1 is equipped with adjustable front and rear suspension units 20. These suspension units are preferably constructed in a known matter such as that disclosed in U.S. Pat. No. 4,313,529, which discloses means for constructing a strut or shock absorber which is adjustable by a rotary valve positioned within one of the passageways running through the piston of the shock absorber or strut. The rotary valve functions to vary the effective cost sectional area of the passageway, thus providing an adjustable damping force. U.S. Pat. No. 4,392,540 discloses a power steering apparatus in which the amount of the steering assist provided by the power steering apparatus is responsive to vehicle speed. In the case of this invention, the amount of power assist is responsive to the instantaneous position of the steering wheel with respect to the calculated center position. Those skilled in the art will appreciate in view of this disclosure that a system according to the present invention could be utilized to control not only adjustable suspension units and steering gears, but also other types of adjustable vehicular devices such as hydraulic crossover suspension systems, variable volume air suspension springs, or variable stabilizer bars.

The component parts of a system according to the present invention are shown in FIGS. 1 and 2. Accordingly, control module 14 receives inputs from steering sensor 12, speed sensor 16, and brake sensor 18. In return, the control module outputs commands to suspension unit operators 20 and steering gear operator 22 (FIG. 2). Those skilled in the art will appreciate in view of this disclosure that the processor within the control module and its associated peripheral equipment could be structured according to several different architectures. In a preferred embodiment, however, the processor is configured so that a control program is sequentially read for each unit command from a read-only memory (ROM) which stores preset control programs. Unit commands are executed by a central processing unit (CPU). The processor integrally includes an input-output control circuit (I/O) for exchanging data with external devices and a random access memory (RAM) for temporarily holding data while the data are being processed.

Steering sensor 12 includes means for measuring the excursion angle of the steering system from a center position determined by the steering sensor in conjunction with the control module and means, again in conjunction with the control module, for measuring the angular velocity which the steering system (e.g., the steering shaft) is being operated. As shown in FIGS. 4 and 5, steering sensor 12 comprises shutter wheel 28, attached to steering shaft 36, which shaft rotates in unison with the steering wheel as the steering wheel is turned by the driver of the vehicle. Shutter wheel 28 has a plurality of apertures 30, in this case 40 in number, which apertures serve to trigger the activity of detectors A and B as the shutter wheel is rotated with the steering system of the vehicle. Because there are 40 apertures contained within shutter wheel 28, the steering sensor provides a signal 80 times during one revolution of the steering wheel and as a result each of the 80 signals or steps indicates 4.5° of rotation of the steering system.

Figure 6A:
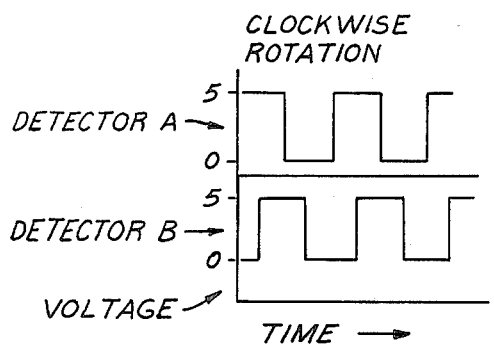
FIG. 6A illustrates the output wave forms of the detectors employed in the steering sensor illustrated in FIGS. 4 and 5 for clockwise rotation.
Figure 6B:
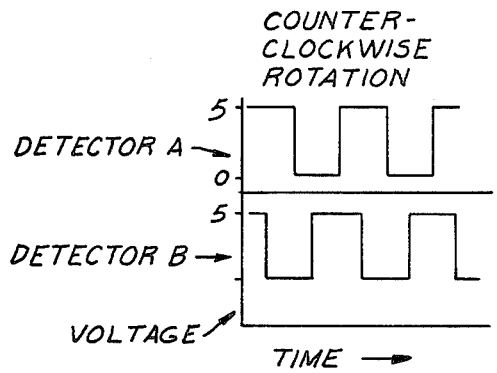
FIG. 6B illustrates the output wave forms of the detectors employed in the steering sensor illustrated in FIGS. 4 and 5 for counterclockwise rotation.

As shown in FIG. 5, each of detectors A and B includes a light emitting diode (LED), 32 and a photo diode, 34. The combination of the LED and photo diode is used to detect movement of shutter wheel 28 and, hence, the steering system. This is possible because the photo diodes have two states—i.e., they are bistable. A conducting state occurs whenever light from the paired LED passes through an aperture 30 in the shutter wheel and impinges upon the photo diode. The output of the detector circuit then rises to approximately 5 volts. A non-conducting state exists whenever the shutter wheel blocks the transmission of light between the LED and the photo diode. As shown in FIG. 6A, clockwise rotation of shutter wheel 28 produces a wave form pattern for the detectors in which detector A undergoes its transition prior to detector B. In other words, detector A leads detector B. On the other hand, as shown in FIG. 6B, counterclockwise rotation of the steering sensor produces a wave form pattern for the detectors in which detector A undergoes its transition after detector B and detector A thus lags detector B. The outputs of detectors A and B are fed into the control module and in this manner control module 14 is allowed to track the direction of the steering system's rotation.

FIG. 7 is a tabulation of the wave forms shown in FIGS. 6A and 6B in a digital format. In conventional fashion, the approximately 5 volts maximum output of the detectors is treated as a logical "1", while the zero output state is treated as a logical "0". FIG. 7 shows each of the possible logic pair states which could be output by detectors A and B. The pairs are arranged in the order in which they will be received by control module 14 for both counterclockwise and clockwise rotation. As seen in FIG. 7, counterclockwise rotation is read from the bottom of the figure to the upper part of the figure with clockwise rotation being read from the top of the tabulation to the lower part of the tabulation.

The output of detectors A and B is further processed by control module 14 to yield a signal indicating the steering system speed or angular velocity. This operation is performed quite simply by merely tracking the number of transitions of one or both detectors during a given unit of time. The number of such transitions during the sampling period will be directly proportional to the angular speed of the steering system. Those skilled in the art will appreciate in view of this disclosure that although the steering sensor described herein operates according to digital electronics principles, the present invention could be practiced through the use of other types of steering sensors such as analog electronic or other types of steering sensors.

Figure 3:
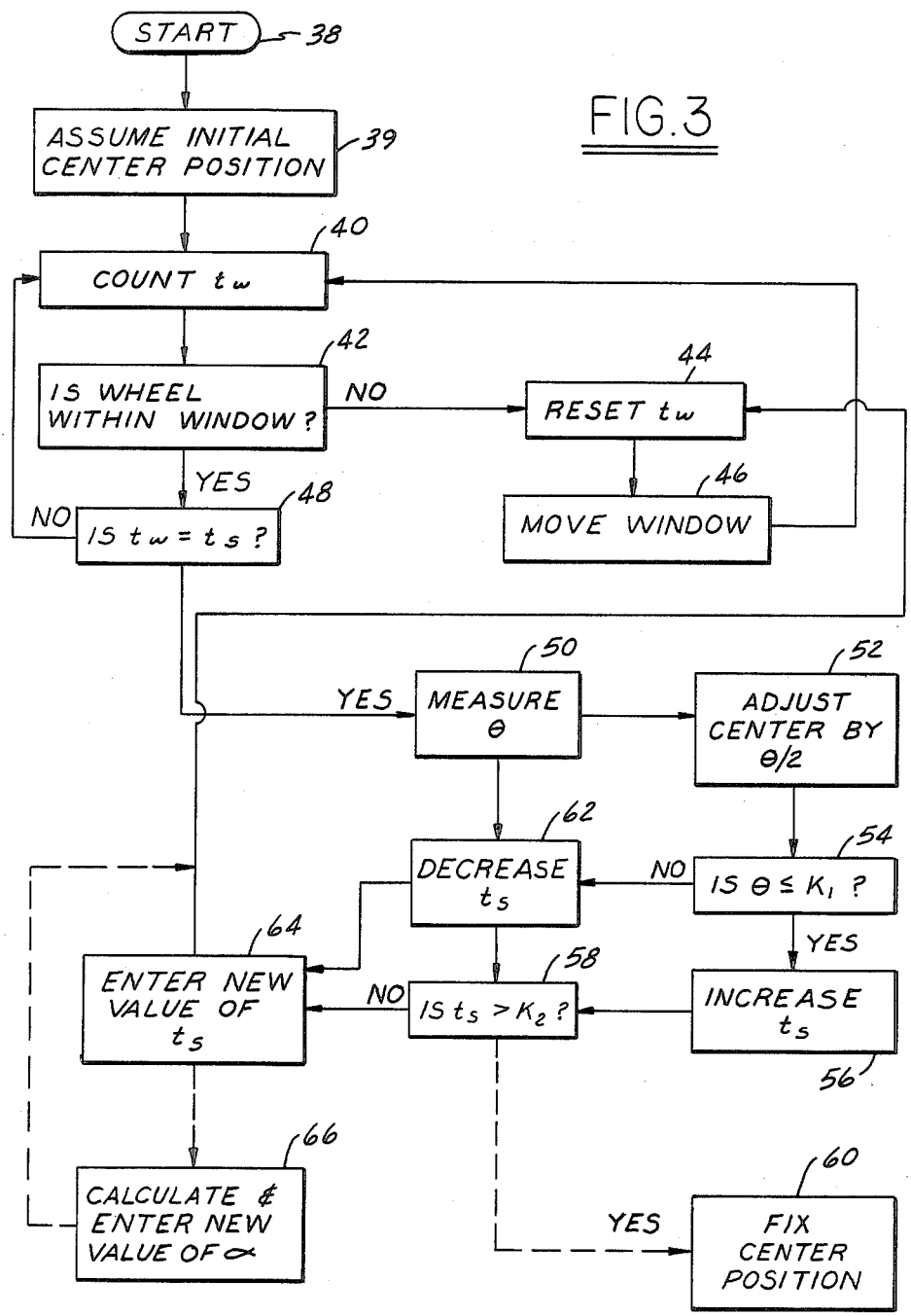
FIG. 3 contains a logic flow block diagram in accordance with an embodiment of this invention.

As previously noted, FIG. 3 comprises a logic flow block diagram in accordance with an embodiment of this invention. The following definitions of terms are employed in FIG. 3:

$t_w$ = the amount of time the steering handwheel and steering system remain within a movable window of operation.

$t_s$ = sample time; i.e., the time $t_w$ must reach for a sample to be taken. This value is maintained within a sampling time register.

$\theta$ = difference between instantaneous steering position and adjusted or initially assumed steering position $\alpha$ = window size Beginning at start block 38 of the logic flow diagram, the processor within control module 14 transfers to block 39 and an initial center position is assumed. The processor then transfers to block 40 wherein a window timer is set into operation. The window timer measures $t_w$, or the amount of time the steering system and steering handwheel stay within a window of operation. Having started to count $t_w$, the processor transfers to block 42 wherein a question is asked about the location of the handwheel and steering system with respect to the window of operation. If the steering wheel is not within the window of operation, $t_w$ is reset to zero at block 44 and the center of the window of operation is reset at block 46 to be coincident with the instantaneous point of operation of the steering system. If, however, the steering wheel is within the window, at block 48 the control module determines the equality, if any, between $t_w$ and $t_s$. The reader will recall here that $t_s$ equals the sample time, or the time $t_w$ must have obtained for a sample to be taken. The event that $t_w$ is not equal to $t_s$, $t_w$ will be less than $t_s$ and the computer transfers at block 48 back to block 40 to continue operation of the window counter.

If at block 48 $t_w$ is equal to $t_s$, the processor transfers to block 50 wherein $\theta$, or the difference between the steering system position characteristic value and the last adjusted position is measured. The steering system position characteristic value may comprise either the instantaneous steering system position, or a time-averaged steering system position, or it may comprise the center of the window of operation of the steering system, or some other value suggested by this disclosure. Once $\theta$ has been measured, the steering center is adjusted at block 52 by dividing measured $\theta$ by a factor greater than 1 and adjusting the center so that the newly adjusted center lies between the steering system position characteristic value and the previously adjusted center. In a preferred embodiment, $\theta$ would be divided by 2 so that the newly adjusted center would lie halfway between the instantaneous center of the previously adjusted center. Those skilled in the art will appreciate in view of this disclosure that the choice to adjust the center by moving halfway between the steering system position characteristic value and the previous adjusted center is a matter of tuning or adaptation of the present invention to a given steering system.

Once the location of the adjusted center has been determined at block 52, the algorithm continues at block 54 with a comparison of $\theta$ to a first constant, $K_1$. Thus, in block 54, if $\theta$ is less than or equal to $K_1$, the algorithm proceeds to block 56 wherein the sampling interval, $t_s$, is increased. It has been determined that normally $t_s$ should be increased by a factor greater than unity. For example, $t_s$ could be doubled. Once $t_s$ is increased at block 56, the computer transfers to block 58 wherein the value of $t_s$ is compared to a second constant $K_2$. In the event that $t_s$ exceeds a predetermined time constant represented by $K_2$, the program will take the last adjusted center position as the correct center position at block 60 and no further adjustment will be made. It should be noted in this regard that the step of fixing the center is optional; the present invention may be practiced without this step by simply allowing the main algorithm to run as long as the vehicle is in operation.

Continuing once again with the main algorithm, if the sampling interval is less than time constant $K_2$, the computer will transfer to block 64 wherein the new value of $t_s$ will be entered into the main program and $t_w$ will be reset at block 44. Returning once again to block 54, in the event that $\theta$ is less than the angle constant $K_1$, the program transfers to block 62 wherein sampling time, $t_s$, is decreased. It has generally been determined that the $t_s$ should be multiplied by a factor which is less than 1. Regardless of whether $t_s$ has been increased in block 56 or decreased in block 62, the value of $t_s$ or sampling time may be used at block 66 to calculate and enter a new value for the size of the window of operation. This may be done according to the following calculation:

$$\alpha\, K_3 \left( \text{INT} \left[ \frac{13 - \text{Log}_2 t_s}{3} \right] \right)$$

Where:
$K_3$ = a constant, in this case, 4.5;
INT = the integer value of the expression in brackets.
$\text{Log}_2 t_s$ = the logarithm to the base 2 of any particular value of $t_s$.

In the present system, the width of a window taken from one leading edge to a second leading edge of the shutter wheel 28 is 4.5°. The equation set forth above for calculating $\alpha$ will therefore yield the following results for the following given values of $t_s$.

| $t_s$ | window size, $\alpha$ |
| --- | --- |
| ½, 1, 2 sec | 18° |
| 4, 8, 16 sec | 13.5° |
| 32, 64, 128 sec | 9° |

As seen from the table above, the window size $\alpha$ will be decreased as the sampling time $t_s$ is decreased. Decreasing the size of the window allows a system according to the present invention to predict the true steering center with increased confidence. In a similar fashion, the increase in $t_s$ which the present system provides enhances the confidence level of the predicted center. Accordingly, the present invention presents a marked improvement over the system disclosed in U.S. Pat. No. 4,621,833 because that system did not provide for variable sampling time, but utilized a fixed sampling time of variable window size. It should be noted here that the use of a variable window size according to the present invention is optional.

Once a precise steering center position has been determined and fixed in the processor's memory, knowledge of the center position can be used as follows. First, in the event that a large value of $\theta$ is sensed by steering sensor 12, such as when the motor vehicle is in a parking maneuver, the amount of power assist provided to the steering gear by steering gear operator 22 may be increased radically. If, however, only a small steering angle $\theta$ is sensed, such as when the vehicle is traversing a relatively straight roadway, the amount of power assist provided to the steering gear may be reduced drastically. In the case of the adjustable suspension unit operators 20, where the steering sensor detects a suitable excursion from the adjusted center position, the suspension unit operators 20 may be directed to assume an appropriate level of damping and/or vehicle height control.

The present invention thus represents a method for determining the center position of a vehicular steering system according to the steps shown in FIG. 3. Blocks 39, 40 and 42 thus correspond to assuming an initial center position and counting the amount of window time during which the steering system has remained within the window of operation $\alpha$ extending about the assumed center position. In block 48, the counted window time, $t_w$, is compared to a variable sampling time $t_s$. In block 50, the difference $\theta$ is measured between the instantaneous steering system position and the assumed center position, but only if the window time is equal to the sample time. In block 52, the assumed center position is adjusted according to the measure difference between the instantaneous steering position and the assumed steering position. In blocks 54, 56 and 62, the sampling time is adjusted according to the measured difference between the instantaneous steering system position and the adjusted steering position. Continuing with other details of this system, at block 44, counted window time is set equal to zero whenever the steering system is operated outside of the window of operation, $\alpha$, or whenever window time is equal to sampling time. The window of operation comprises an angular region of operation of a rotatable steering shaft with the angular region having a predetermined size which may be varied in accordance with the magnitude of sampling time. The hardware of the present system may be described according to its functional attributes as follows. First, steering sensor 12 and its accompanying circuitry within control module 14 comprise sensor means for measuring the difference between the instantaneous position of the steering system and a previously determined center position. The sensor and associated circuitry also comprise means for defining a window of operation extending about the center position. The control module includes a window timer operatively connected with a steering sensor for determining the amount of time the steering system is operated within a given window. A sampling time register operatively connected with the sensor and window timer holds an appropriate sampling interval for determining the timing of successive events in which the steering sensor measures the difference between the instantaneous position of the steering system and the previously determined center position. Finally, the processor means within the module which is operatively connected with the sensor means and with the window and sampling timers directs the sensor means to measure the difference between the instantaneous position of the steering system and the previously determined center position when an appropriate sampling interval has been reached and also adjusts the previously determined center position based upon the measured angular difference. Finally, the processor adjusts the sampling interval according to the magnitude of the measured difference between the instantaneous position of the steering system and the previously determined center position. Finally, the window size may be adjusted according to the size of the sampling time.

Various modifications and variations will no doubt occur to those skilled in the arts to which this invention pertains. For example, the particular sensors used in conjunction with the disclosed system may be varied from those herein and the system may be operated according to various time constants and changes in window size and other values for the variables contained within the calculational scheme described herein. These and all other variations which basically rely on the teachings to which this disclosure has advanced the art are properly considered within the scope of this invention as defined by the appended claims.

We claim:

1. A method for determining the center position of a vehicular steering system, comprising the steps of:
   assuming an initial center position;
   counting the amount of window time during which the steering system has remained within a window of operation extending about said assumed center position;
   comparing the counted window time to a variable sampling time;
   measuring the difference between a steering system position characteristic value and said assumed center position whenever said window time bears a predetermined relationship to said sampling time;
   adjusting the assumed center position according to said measured difference between said steering system position characteristic value and said assumed center position;
   adjusting said sampling time according to said measured difference between said steering system position characteristic value and said adjusted center position;
   repeating each of said steps sequentially with said adjusted center position substituted for said assumed center position.

2. A method according to claim 1 wherein the counted window time is set equal to zero whenever said steering system is operated outside of said window of operation.

3. A method according to claim 1 wherein the counted window time is set equal to zero whenever said window time is equal to said sampling time.

4. A method according to claim 1 wherein said steering system position characteristic value comprises the instantaneous steering system position.

5. A method according to claim 1 wherein said steering system position characteristic value comprises a time-averaged function of the steering system position.

6. A method according to claim 1 wherein said steering system position characteristic value comprises the center of said window of operation.

7. A method according to claim 1 wherein said window of operation comprises an angular region of operation of a rotatable steering shaft, with said angular region having a predetermined size.

8. A method according to claim 7 wherein said window of operation is relocated between said rotatable steering shaft is operated outside of said window, so that the relocated window extends on either side of the instantaneous position of said steering shaft.

9. A method according to claim 1 wherein said window of operation comprises an angular region of operation of a rotatable steering shaft, with said angular region being of variable size.

10. A method according to claim 9 wherein the size of said window of operation bears a predetermined relationship to said sampling time.

11. A method according to claim 10 wherein the size of said window of operation is generally decreased as said sampling time is increased.

12. A method according to claim 1 wherein each of said steps is repeated sequentially until said sampling time reaches a predetermined value.

13. A method according to claim 1 wherein the difference between the instantaneous steering system position and the assumed center position is measured whenever said window time is equal to said sampling time.

14. A method according to claim 1 wherein the sampling time is increased when the measured difference between the instantaneous steering system position and the adjusted center position is less than a predetermined value.

15. A method according to claim 1 wherein the sampling time is decreased when the measured difference between the instantaneous steering system position and the adjusted center position is greater than a predetermined value.

16. A means for determining the center position of a vehicular steering system, comprising:
   sensor means for: (i) measuring the difference between the instantaneous position of the steering system and a previously determined center position, and (ii) for defining a window of operation extending about said center position;
   a window timer operatively connected with said sensor means for determining the amount of time said steering system is operated within said window;
   a sampling time register, operatively connected with said sensor and said window timer, for holding an appropriate sampling interval between successive events in which said sensor measures said difference between the instantaneous position of the steering system and said previously determined center position; and
   processor means operatively connected with said sensor means and with said window and sampling timers for: (i) directing said sensor means to measure said difference between the instantaneous position of the steering system and said previously determined center position when said appropriate sampling interval has been reached; and (ii) adjusting said previously determined center position based upon said measured difference and (iii) adjusting said sampling interval held by said sampling time register according to the magnitude of said measured difference.

17. A means rotating to claim 16 wherein said sensor comprises a rotary device operatively connected with a rotatable steering shaft.

18. A means according to claim 16 wherein said sensor means relocates said window of operation whenever said steering system is operated outside of said window, such that the instantaneous center of said window is coincident with the instantaneous operating position of said steering system.

* * * * *